United States Patent
Przybyla et al.

(10) Patent No.: US 11,685,115 B2
(45) Date of Patent: Jun. 27, 2023

(54) ADDITIVE MANUFACTURING WITH NOZZLES AT DIFFERENT DIE WIDTHS

(71) Applicant: HEWLETT-PACKARD DEVELOPMENT COMPANY, L.P., Spring, TX (US)

(72) Inventors: James R Przybyla, Corvallis, OR (US); Jason Hower, Corvallis, OR (US); Michael G Monroe, Corvallis, OR (US); Galen P Cook, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 16/493,050

(22) PCT Filed: Mar. 12, 2018

(86) PCT No.: PCT/US2018/022036
§ 371 (c)(1),
(2) Date: Sep. 11, 2019

(87) PCT Pub. No.: WO2019/177578
PCT Pub. Date: Sep. 19, 2019

(65) Prior Publication Data
US 2021/0323228 A1    Oct. 21, 2021

(51) Int. Cl.
*B29C 64/209*    (2017.01)
*B33Y 30/00*    (2015.01)
*B29C 64/165*    (2017.01)

(52) U.S. Cl.
CPC .......... *B29C 64/209* (2017.08); *B29C 64/165* (2017.08); *B33Y 30/00* (2014.12)

(58) Field of Classification Search
CPC ....... B29C 64/209; B29C 48/345; B41J 2/145
(Continued)

(56) References Cited

U.S. PATENT DOCUMENTS 5,677,718 A * 10/1997 Crawford ................... B41J 2/19
347/92
6,024,440 A    2/2000 Murthy et al.
(Continued)

FOREIGN PATENT DOCUMENTS

CN    1709699 A    12/2005
CN    1980794 A    6/2007
(Continued)

OTHER PUBLICATIONS

Grabchenko, et al. Integrated Generative Technologies. Kharkov.

*Primary Examiner* — Seyed Masoud Malekzadeh
(74) *Attorney, Agent, or Firm* — Foley & Lardner LLP (57) ABSTRACT

In one example in accordance with the present disclosure, an additive manufacturing module is described. The additive manufacturing module includes an agent distributor to selectively distribute a fabrication agent onto layers of build material. The agent distributor includes at least one fluidic ejection die. Each fluidic ejection die includes a plurality of nozzles arranged along a die length and a die width, the plurality of nozzles arranged such that, for each set of neighboring nozzles, a respective subset of each set of neighboring nozzles are positioned at different die width positions along the width of the fluidic ejection die. The fluidic ejection die also includes, for each respective nozzle of the plurality of nozzles, a respective ejection chamber fluidically coupled to the respective nozzle and for each respective ejection chamber, at least one respective fluid feed hole fluidically coupled to the respective ejection chamber.

17 Claims, 6 Drawing Sheets

(58) Field of Classification Search
USPC .................................................. 425/375, 463
See application file for complete search history.

(56) References Cited

U.S. PATENT DOCUMENTS

| | | | | |
|---|---|---|---|---|
| 6,146,567 A * | 11/2000 | Sachs | ...................... | B22F 10/10 |
| | | | | 118/313 |
| 6,345,879 B1 * | 2/2002 | Fisher | ...................... | B41J 2/145 |
| | | | | 347/20 |
| 6,357,855 B1 | 3/2002 | Kerekes | | |
| 6,450,614 B1 * | 9/2002 | Scheffelin | ................ | B41J 2/155 |
| | | | | 347/42 |
| 7,625,080 B2 * | 12/2009 | Hess | ...................... | B41J 2/1433 |
| | | | | 347/85 |
| 9,315,019 B2 * | 4/2016 | Govyadinov | .......... | B41J 2/1652 |
| 9,561,666 B2 * | 2/2017 | Govyadinov | ........ | B41J 2/04596 |
| 9,776,422 B2 * | 10/2017 | Govyadinov | ............ | B41J 2/175 |
| 10,369,790 B2 * | 8/2019 | Choy | ...................... | B05B 1/14 |
| 11,123,917 B2 * | 9/2021 | Gardiner | ............... | B29C 64/232 |
| 2002/0051039 A1 * | 5/2002 | Moynihan | ............ | A01K 15/025 |
| | | | | 347/68 |
| 2005/0140722 A1 * | 6/2005 | Shibata | ...................... | B41J 2/15 |
| | | | | 347/40 |
| 2006/0103691 A1 * | 5/2006 | Dietl | ...................... | B41J 2/2125 |
| | | | | 347/40 |
| 2006/0221125 A1 * | 10/2006 | Konno | ................... | B41J 2/1433 |
| | | | | 347/40 |
| 2007/0132815 A1 * | 6/2007 | Sakaida | ................... | B41J 2/155 |
| | | | | 347/85 |
| 2007/0291078 A1 * | 12/2007 | Drury | ................... | B41J 2/1634 |
| | | | | 347/41 |
| 2011/0102509 A1 * | 5/2011 | Sharan | ................... | B41J 2/1632 |
| | | | | 29/890.1 |
| 2011/0187773 A1 * | 8/2011 | Kusakari | ................ | B41J 2/2132 |
| | | | | 347/40 |
| 2012/0160925 A1 * | 6/2012 | Hoisington | .............. | B41J 2/175 |
| | | | | 239/104 |
| 2014/0291886 A1 * | 10/2014 | Mark | ...................... | B33Y 30/00 |
| | | | | 264/259 |
| 2015/0174824 A1 * | 6/2015 | Gifford et al. | .......... | B29C 67/00 |
| 2015/0298394 A1 | 10/2015 | Sheinman | | |
| 2016/0325498 A1 | 11/2016 | Gelbart | | |
| 2017/0129252 A1 | 5/2017 | Barnett et al. | | |
| 2017/0355190 A1 * | 12/2017 | Mu | ...................... | B41J 2/14201 |
| 2018/0056582 A1 * | 3/2018 | Matusik | ................ | B29C 64/112 |
| 2018/0126650 A1 * | 5/2018 | Murphree | .............. | B33Y 40/00 |
| 2018/0222203 A1 * | 8/2018 | Przybyla | .............. | B41J 2/14112 |

FOREIGN PATENT DOCUMENTS

| | | |
|---|---|---|
| CN | 106853683 A | 6/2017 |
| EP | 3710228 A1 | 9/2020 |
| JP | 2004291625 | 10/2004 |
| JP | 2005088548 A | 4/2005 |
| JP | 2006272880 | 10/2006 |
| JP | 2011520665 | 7/2011 |
| JP | 2014510649 | 5/2014 |
| JP | 2015189035 | 11/2015 |
| JP | 2018502738 | 2/2018 |
| JP | 2018034465 | 3/2018 |
| JP | 2019006050 | 1/2019 |
| WO | WO2012152510 A1 | 11/2012 |
| WO | WO2016030405 A1 | 3/2016 |
| WO | 2017/100853 A1 | 6/2017 |
| WO | 2017/152142 A1 | 9/2017 |
| WO | WO-2017196323 A1 * | 11/2017 ............ B33Y 10/00 |
| WO | 2019/177578 A1 | 9/2019 |

* cited by examiner

Fig. 6 ic Manufacturing with
ADDITIVE MANUFACTURING WITH NOZZLES AT DIFFERENT DIE WIDTHS

BACKGROUND

Additive manufacturing devices produce three-dimensional (3D) objects by building up layers of material. Some additive manufacturing devices are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are provided for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing devices make a three-dimensional (3D) object through the solidification of layers of a build material on a bed within the device. Additive manufacturing devices make objects based on data in a 3D model of the object generated, for example, with a computer-aided drafting (CAD) computer program product. The model data is processed into slices, each slice defining portions of a layer of build material that is to be solidified.

In one example, to form the 3D object a build material, which may be powder, is deposited on a bed. A fusing agent is then dispensed onto portions of the layer of build material that are to be fused to form a layer of the 3D object. The system that carries out this type of additive manufacturing may be referred to as a powder and fusing agent based system. The fusing agent disposed in the desired pattern increases the energy absorption of the underlying layer of build material on which the agent is disposed. The build material is then exposed to energy such as electromagnetic radiation. The electromagnetic radiation may include infrared light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D printing operations.

While specific reference is made to one type of additive manufacturing process, the principles described herein may apply to other types of additive manufacturing processes. For example in another system, the build material may be loosely held together by the fusing agent in the additive manufacturing device and a final fusing may be done externally after the part is assembled.

While such additive manufacturing devices and systems allow for simplified 3D printing, some characteristics impede their more complete implementation. For example, in some scenarios, foreign particles may enter the ejection chamber. Some of these foreign particles may be of sufficient size, be present in sufficient quantities, or have other attributes that negatively affect the operation of the nozzles in the agent distributor.

For example, in an additive manufacturing operation, particulate matter from a powder-based building volume could enter the ejection chamber of the nozzle that dispenses the fusing agent or another fabrication agent. For example, the ejection of the fabrication agent may be done with sufficient velocity to dislodge particulate matter from the build area. The dislodged particulate matter could enter and clog the nozzle, leading to irregular fluid deposition, or may inhibit fluid deposition altogether. Moreover, in some cases, the agent distributor moves perpendicular to the ejected fluid. That is, fluid may be ejected downward in a y-direction and the agent distributor may translate along an x-plane. In this example, when the nozzles on the agent distributor are densely populated, entrained air from fluid ejection interfaces with the natural slipstream of air generated above the substrate. The interface of these different airstreams creates vortices that flow upward in a recirculation pattern. These vortices provide energy to powder particles suspended above the build unit. These particles, being light, may drift up into, and block the nozzle openings.

In other examples, these vortices cause the fabrication agent itself to rise and potentially clog the nozzle openings. Even further, in some cases, the fabrication agent and/or particulate matter may not enter the nozzles, but be deposited on the fluidic ejection die. Then, cleaning components such as a wiper may wipe any fabrication agent and/or particulate matter on the fluidic ejection die into the nozzle openings. Such blocked nozzles obviously impact the operation, and efficacy of subsequent ejection actions.

The clogging of the nozzle orifice may even damage the ejector. For example, the fluid in a nozzle serves to cool the ejector following heating and vaporization of a fluid bubble. If the nozzle orifice is clogged, this may impact the draw of fluid from the reservoir into the firing chamber, thus exposing the ejector to air for a longer period of time. This increased air exposure can lead to premature failure of the ejector and can further degrade fluid ejection performance. That is, the clogged nozzle will be over-heated if no fluid is refilled into the firing chamber to cool the ejector. This decreases the reliability of the nozzle, and may result in failure of the nozzle.

The interaction of these two airflows can also impact 3D print quality. For example, the vortices may alter the fluid path from the additive manufacturing device to the substrate thus resulting in less accurate fluid deposition and less accurate additive manufacturing.

Accordingly, the present specification describes devices and systems for preventing the formation of vortices sufficiently large to cause damage to components and impact print quality. Specifically, the present specification describes a fluidic ejection die that includes a number of nozzles. The nozzles are arranged along a die width and a die length. The nozzles are grouped with a set of neighboring nozzles being adjacent along a die length. In one example, the set of neighboring nozzle may be an angled column. In this example, adjacent neighboring nozzles have different die width positions than one another. For example, the neighboring nozzles may be angled, or non-orthogonal to the die width. Having such a non-orthogonal array alters the airstreams that result from fluidic ejection. The altered airstreams interact less with the slipstream formed by movement of the agent distributor such that the vortices previously described are less prominent. As such, the fabrication agent and/or particulate matter is less likely to rise above the surface of the powder-build material and thus is less likely to enter, and potentially block, the nozzles of the fluidic ejection die.

Specifically, the present specification describes an additive manufacturing module. The additive manufacturing module includes an agent distributor to selectively distribute a fabrication agent onto layers of build material. The agent distributor includes at least one fluidic ejection die. Each fluidic ejection die includes a plurality of nozzles arranged along a die length and a die width. The plurality of nozzles are arranged such that, for each set of neighboring nozzles, a respective subset of each set of neighboring nozzles are positioned at different die width positions along the width of the fluidic ejection die. For each respective nozzle of the plurality of nozzles, the fluidic ejection die includes a respective ejection chamber fluidically coupled to the respective nozzle. For each respective ejection chamber, at least one respective fluid feed hole is fluidically coupled to the respective ejection chamber.

The present specification also describes an additive manufacturing device. The additive manufacturing device includes a build material distributor to successively deposit layers of build material into a build area and an agent distributor to selectively distribute a fabrication agent onto the layers of build material. The agent distributor includes a thermal fluidic ejection die. The thermal fluidic ejection die includes a plurality of nozzles arranged into angled columns along a die length. The angled columns are distributed across a width of the fluidic ejection die and are arranged such that each angled column is non-orthogonal to a die width. For each respective nozzle of the plurality of nozzles, a respective ejection chamber is fluidically coupled to the respective nozzle and for each respective ejection chamber, at least one respective fluid feed hole is fluidically coupled to the respective ejection chamber. In this example, adjacent nozzles within an angled column have a pitch less than an area covered by an output of a nozzle.

The present specification also describes an additive manufacturing system. The system includes a bed to contain a volume of build material and a build material distributor to successively deposit layers of build material into a build area. The system also includes an agent distributor to selectively distribute a fabrication agent onto the layers of build material. The agent distributor includes a fluidic ejection die. The fluidic ejection die includes a plurality of nozzles arranged into angled columns along a die length. The angled columns are distributed across a width of the fluidic ejection die and are arranged such that, each angled column is non-orthogonal to a die width. For each respective nozzle of the plurality of nozzles, a respective ejection chamber is fluidically coupled to the respective nozzle and for each respective ejection chamber, at least one respective fluid feed hole is fluidically coupled to the respective ejection chamber. In this example, adjacent nozzles within an angled column have a pitch less than an area covered by an output of a nozzle.

In summary, using such an additive manufacturing module 1) spreads air flow resulting from fluid ejection and/or drops in flight more evenly in multiple directions; 2) reduces shear forces in the vicinity of the build area; 3) prevents particle entry into the fluidic ejection nozzles; 4) improves ejection accuracy, and 5) improves additive manufacturing device life.

As used in the present specification and in the appended claims, the term "nozzle" refers to an individual component of a fluid ejection die that dispenses fluid onto a surface. The nozzle includes at least a firing chamber, an ejector, and a shared nozzle orifice.

Moreover, as used in the present specification and in the appended claims, the term "set of neighboring nozzles" refers to a grouping of adjacent nozzles along a length of the fluidic ejection die. For example, any number of nozzles in an angled column is one example of a set of neighboring nozzles.

Still further, as used in the present specification and in the appended claims, the term "fabrication agent" refers to any number of agents that are deposited and includes for example a fusing agent, an inhibitor agent, a binding agent, a coloring agent, and/or a material delivery agent. A material delivery agent revers to a fluid carrier that includes suspended particles of at least one material used in the additive manufacturing process.

Still further, as used in the present specification and in the appended claims, the term "pitch spacing" refers to a nozzle-to-nozzle spacing between columnar nozzles.

Figure 1:
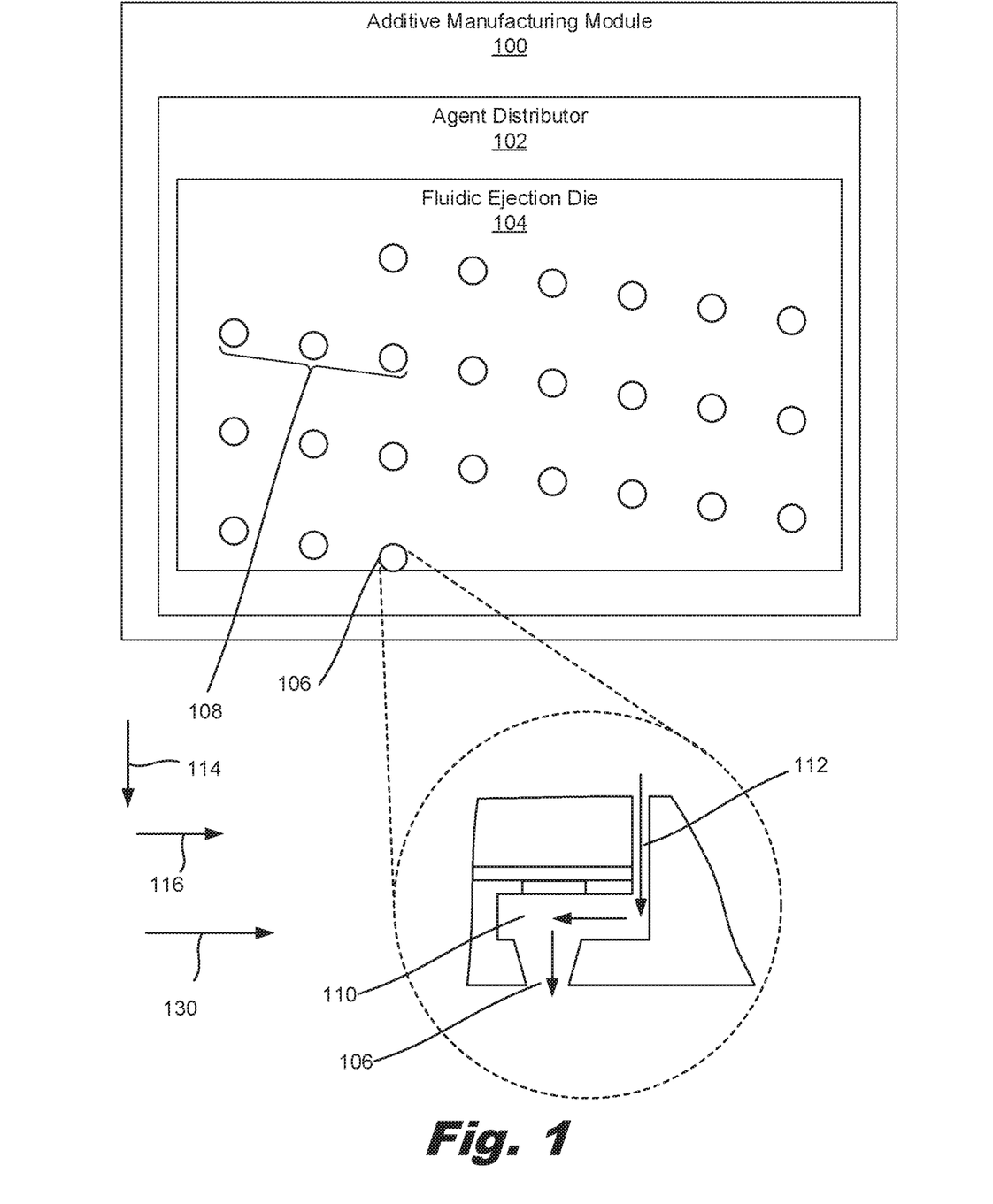
FIG. 1 is a block diagram of an additive manufacturing module with nozzles at different die widths, according to an example of the principles described herein.

Turning now to the figures, FIG. 1 is a block diagram of an additive manufacturing module (100) with nozzles (106) at different die widths, according to an example of the principles described herein. In general, apparatuses for generating three-dimensional objects may be referred to as additive manufacturing systems. The additive manufacturing module (100) is a component of such an additive manufacturing system. Specifically, the additive manufacturing module (100) is a component that includes the fluidic ejection die (104) that includes nozzles (106) through which a fabrication agent is disposed. That is, in an example of an additive manufacturing process, a layer of build material may be formed in a build area. A fusing agent may be selectively distributed on the layer of build material in a pattern of a layer of a three-dimensional object. An energy source may temporarily apply energy to the layer of build material. The energy can be absorbed selectively into patterned areas formed by the fusing agent and blank areas that have no fusing agent, which leads to the components to selectively fuse together.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where the powder-based build material may include wet and/or dry powder-based materials, particulate materials, and/or granular materials. In some examples, the build material may be a weak light absorbing polymer. In some examples, the build material may be a thermoplastic. Furthermore, as described herein, the functional agent may include liquids that may facilitate fusing of build material when energy is applied. The fusing agent may be a light absorbing liquid, an infrared or near infrared absorbing liquid, such as a pigment colorant.

To facilitate the deposition of the fusing agent, the additive manufacturing module (100) includes at least one agent distributor (102). An agent distributor (102) includes at least one fluidic ejection die (104) that includes a plurality of nozzles (106) to distribute a fusing agent onto the layers of build material. The agent distributor (102) selectively distributes an agent on a build layer in the build area concurrent with movement of the building area and/or a scanning carriage to which the additive manufacturing module (100) is affixed. The agent distributor (102), and more particularly the fluidic ejection die (104) includes nozzles (106) through which the fusing agent is selectively ejected. The nozzles (106) are a component of a fluidic ejection device which includes ejection chambers (110) and a fluid feed hole (112). In one example, fluidic ejection devices that are used in inkjet printing devices may be used within the fluidic ejection die (104).

While specific mention is made to an agent distributor (102) that distribute fusing agent, the agent distributor (102) may distribute any type of fabrication agent such as an inhibitor agent, binding agent, coloring agent, and/or material delivery agent.

The fluid ejection device includes a number of components for depositing a fluid onto a surface, which components may rely on thermal energy to operate. For example, the fluidic ejection device may include an ejector to eject fluid from the ejection chamber onto the surface. The ejector may be a thermal resistor. As the thermal resistor heats up in response to an applied energy, such as a supplied voltage pulse. As the thermal resistor heats up, a portion of the fluid in the ejection chamber vaporizes to form a bubble. This bubble pushes fluid out the nozzle and onto the surface. As the vaporized fluid bubble collapses, a negative pressure within the ejection chamber draws fluid into the ejection chamber from the fluid supply, and the process repeats. This system is referred to as a thermal inkjet system. In other words, the fluidic ejection die (104) includes a plurality of nozzles (106), with each respective nozzle (106) corresponding to a respective ejection chamber (110) to hold fluid to be ejected through the nozzle (106) and for each ejection chamber (110) a respective fluid feed hole (112) that fluidically couples the respective ejection chamber (110) to a fluid supply.

Returning to the fluidic ejection die (104). The fluidic ejection die (104) includes a plurality of nozzles (106) arranged along a die length and a die width. In the example depicted in FIG. 1, the die length is the dimension of the die along the direction (114) and a die width is the dimension of the die along the direction (116).

The nozzles (106) may be grouped into a set (108) of neighboring nozzles (106). For example, a set (108) of neighboring nozzles (106) may be any grouping of nozzles (106) in a particular angled column. For each set (108) of neighboring nozzles (106) a respective subset of that set may have different die widths positions along a die width. That is, a first nozzle (106) in the set may have a certain die width position, as measured from a point of reference such as a left hand side and a second nozzle (106) in the set (108) may have a die width position, measured from the same point of reference, which is different than the first. In this example, the subset may be any number of nozzles (106). For example, the set (108) of neighboring nozzles (106) may include at least three nozzles (106), and the subset may include a single nozzle (106).

Thus in summary, the arrangement of nozzles (106) on the fluidic ejection die (108) is in a non-rectangular, or non-square pattern. As one specific example, the set of neighboring nozzles (108) may be angled columns of nozzles (106) with each angled column having a non-orthogonal angle relative to the die width, which die width is indicated by the arrow (116). However, other configurations are possible with different adjacent nozzles (106) within the set (108) having different die width positions. As depicted in FIG. 1, in some examples nozzles (106) further down the die length, along the arrow (114) may have a die width positon that is greater than, along the line (116), an immediately preceding nozzle (106). However, in other examples, nozzles (106) further down the die length along the arrow (114) may have a die width position that is less than, along the line (116), an immediately preceding nozzle (106).

Arranging the nozzles (106) in such a non-orthogonal orientation reduces the air vortices that can affect fluid deposition and additive manufacturing device operation. For example, the fluidic ejection die (104) may move across a build area in a direction indicated by the arrow (130). When nozzles (106) have the same die width position along a die length, the airstreams resultant from fluid deposition aggregate and increase in strength and thus have a greater interaction with a slipstream over the surface of the substrate so as to create vortices which can impact additive manufacturing device operation and fluidic ejection. However, by staggering the nozzles (106) as described herein, the airstreams resultant from fluid deposition by each nozzle (106) interact to a much smaller degree, thus avoiding the increased airstream. The reduced airstream does not react as strongly with the airstream over the substrate surface thus preventing the formation of vortices to the degree that may interfere with fluidic ejection operations.

Figure 2:
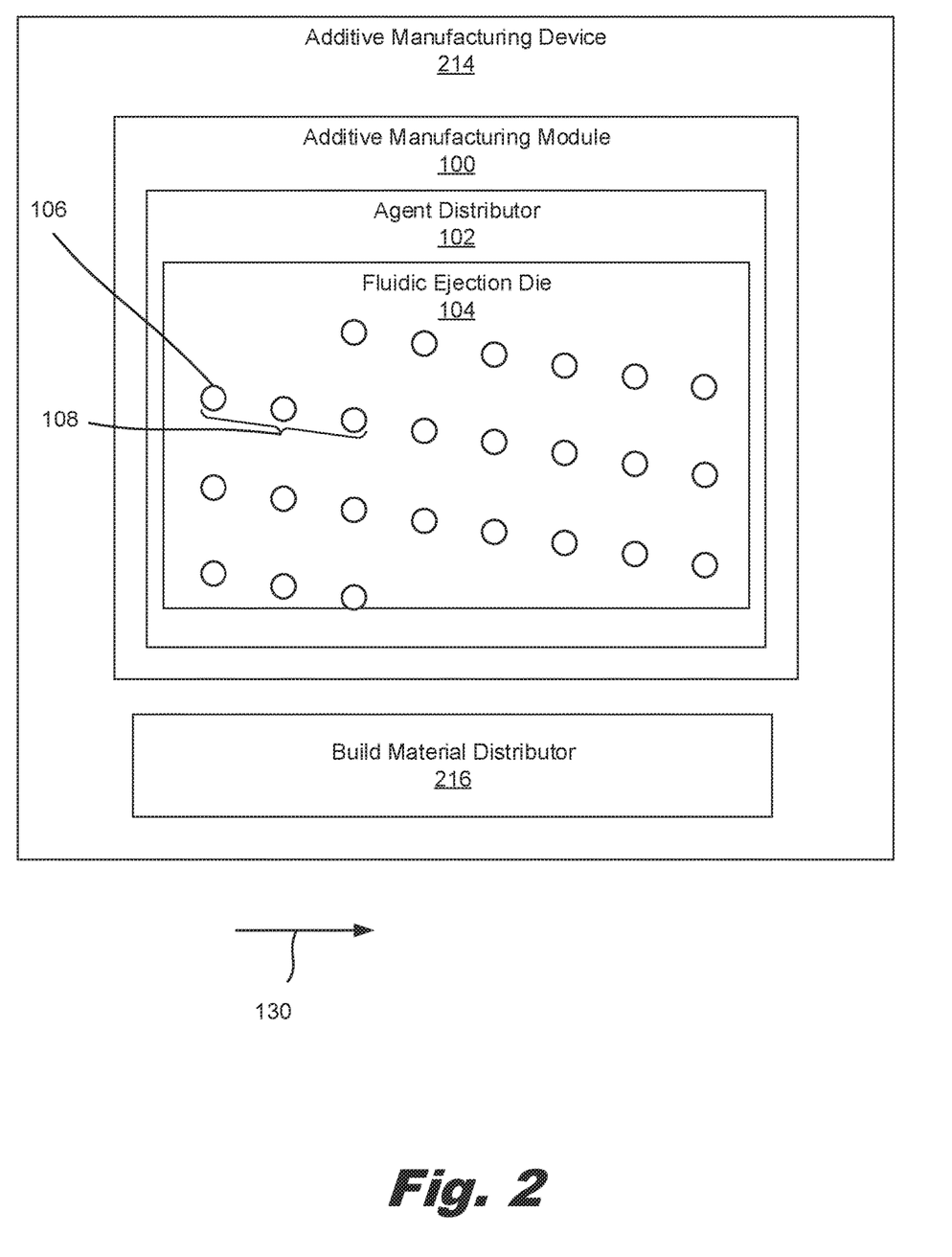
FIG. 2 is a block diagram of an additive manufacturing device with nozzles at different die widths, according to an example of the principles described herein.

FIG. 2 is a block diagram of an additive manufacturing device (214) with nozzles (106) at different die widths, according to an example of the principles described herein. The additive manufacturing device (214) includes the additive manufacturing module (100) with its included agent distributor (102). As described above the agent distributor includes a fluidic ejection die (104) with nozzles (106) wherein sets (108) of neighboring nozzles have die width positions that differ from one another. As depicted in FIG. 2, in some specific examples, the set (108) of neighboring nozzles (106) may be arranged into angled columns along the die length. In this example, the angled columns are arranged such that each angled column is non-orthogonal to the die width as well as the die length. Note that in some examples, as depicted in FIG. 2, a pitch, or a center-to-center offset, of adjacent nozzles (106) within an angled column is less than an area covered by an output of a nozzle (106). That is the resulting output of such nozzles (106) would overlap. Thus, it can be ensured that every point on the substrate can receive fluid from a nozzle (106). In some examples, the agent distributor (102) may be coupled to a scanning carriage. In operation, the agent distributor (102) ejects a fabrication agent as the scanning carriage moves over the build area along the scanning axis.

As depicted in FIG. 2, the additive manufacturing device (214) also includes a build material distributor (216). The build material distributor (216) successively deposits layers of the build material in a build area. The build material distributor (216) may include a wiper blade, a roller, and/or a spray mechanism. The build material distributor (216) may be coupled to a scanning carriage. In operation, the build material distributor (216) places build material in the build area as the scanning carriage moves over the build area along the scanning axis.

While particular reference is made to the agent distributor (102) and build material distributor (216) moving relative to the build area, in some examples the build area may move and the agent distributor (102) and build material distributor (216) may remain stationary.

Figure 3:
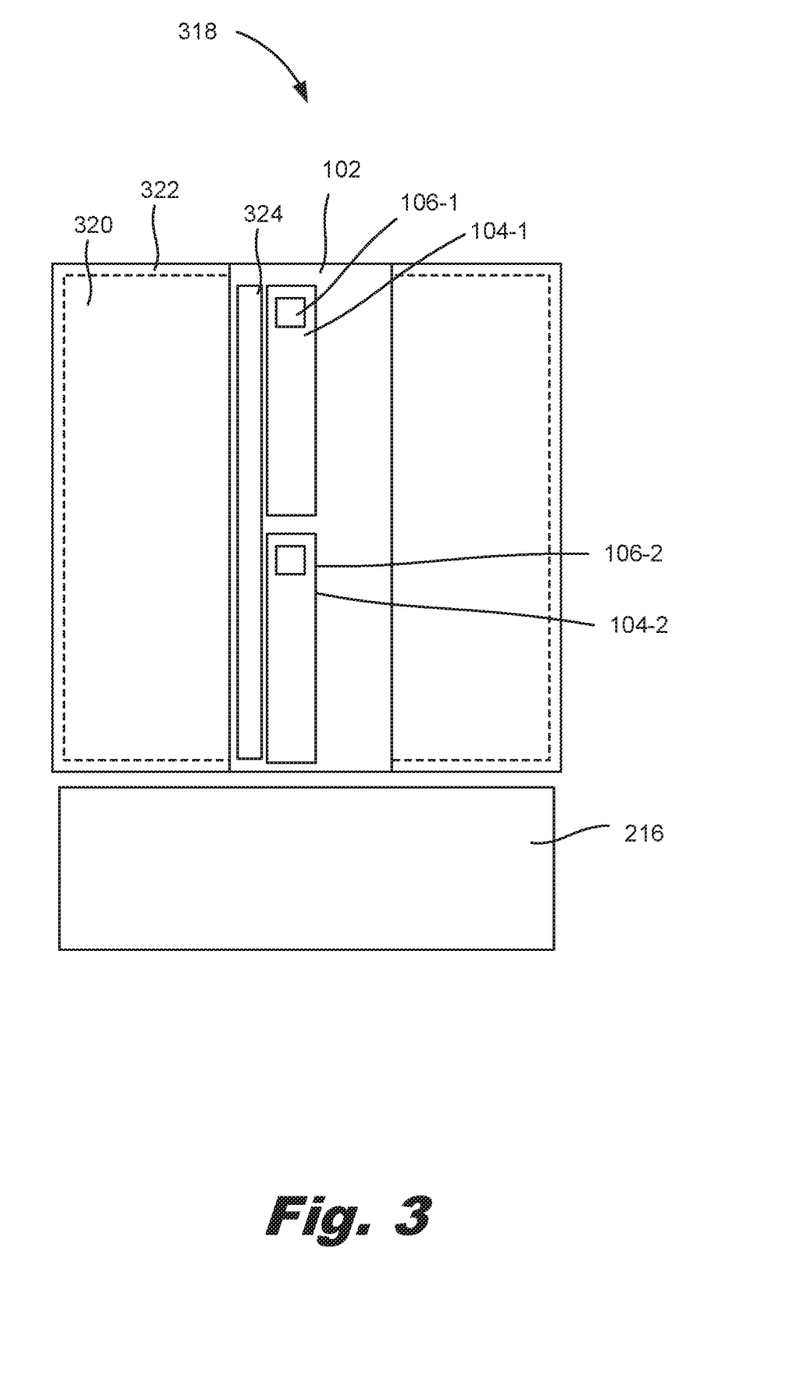
FIG. 3 is a simplified top diagram of an additive manufacturing system with a bed, heater, and with nozzles at different die widths, according to an example of the principles described herein.

FIG. 3 is a simplified top diagram of an additive manufacturing system (318) with a bed (322), heater (324), and with nozzles (106) at different die widths, according to an example of the principles described herein. In general, apparatuses for generating three-dimensional objects may be referred to as additive manufacturing systems (318). The system (318) described herein may correspond to three-dimensional printing systems, which may also be referred to as three-dimensional printers. In an example of an additive manufacturing process, a layer of build material may be formed in a build area (320). As used in the present specification and in the appended claims, the term "build area" refers to an area of space wherein the 3D object is formed. The build area (320) may refer to a space bounded by the bed (322) and chamber walls.

The additive manufacturing system (318) includes the build material distributor (216) as described above to successively deposit layers of the build material in the build area (320). While FIG. 3 depicts the build material distributor (216) as being orthogonal to the agent distributor (102), in some examples the build material distributor (216) may be in line with the agent distributor (102).

The additive manufacturing system (318) includes the agent distributor (102) as described above which deposits a fusing agent or other fabrication agent on build material on the bed (322). As described above, the agent distributor (102) includes at least one fluidic ejection die (104) that includes nozzles (106). In one example, the fluidic ejection devices that include the nozzles (106) are inkjet printing devices. In this example, the fabrication agent may be a printing liquid. In other examples, an agent distributor (102) may include other types of fluidic ejection devices that selectively eject small volumes of liquid.

The agent distributor (102) includes at least one fluidic ejection die (104-1) arranged generally end-to-end with other fluidic ejection die (104-2) along a width of the agent distributor (102). In such examples, the width of the agent distributor (102) corresponds to a dimension of the build area (320). The agent distributor (102) selectively distributes an agent on a build layer in the build area (320). As noted above, in some examples the bed (322) translates in a horizontal direction to allow placement of the fabrication agent in a desired pattern and in other examples the agent distributor (102)/build material distributor (216) translate in the horizontal direction. The bed (322) may also move in a vertical direction as successive layers of build material are deposited into the build area (320). That is, as one layer of build material is deposited and fabrication agent disposed thereon, the bed (322) may move downward vertically such that a subsequent layer of build material can be deposited and selectively hardened.

The additive manufacturing system (318) may include at least one heater (324) to selectively fuse portions of the build material to form an object via the application of heat to the build material. A heater (324) may be any component that applies thermal energy. Examples of heaters (324) include infrared lamps, visible halogen lamps, resistive heaters, light emitting diodes LEDs, and lasers. As described above, build material may include a fusible build material that fuses together once a fusing temperature is reached. Accordingly, the heater (324) may apply thermal energy to the build material so as to heat portions of the build material past this fusing temperature. Those portions that are heated past the fusing temperature have a fusing agent disposed thereon and are formed in the pattern of the 3D object to be printed. The fusing agent increases the absorption rate of that portion of the build material. Thus, a heater (324) may apply an amount of energy such that those portions with an increased absorption rate reach a temperature greater than the fusing temperature while those portions that do not have the increased absorption rate to not reach a temperature greater than the fusing temperature.

Figure 4:
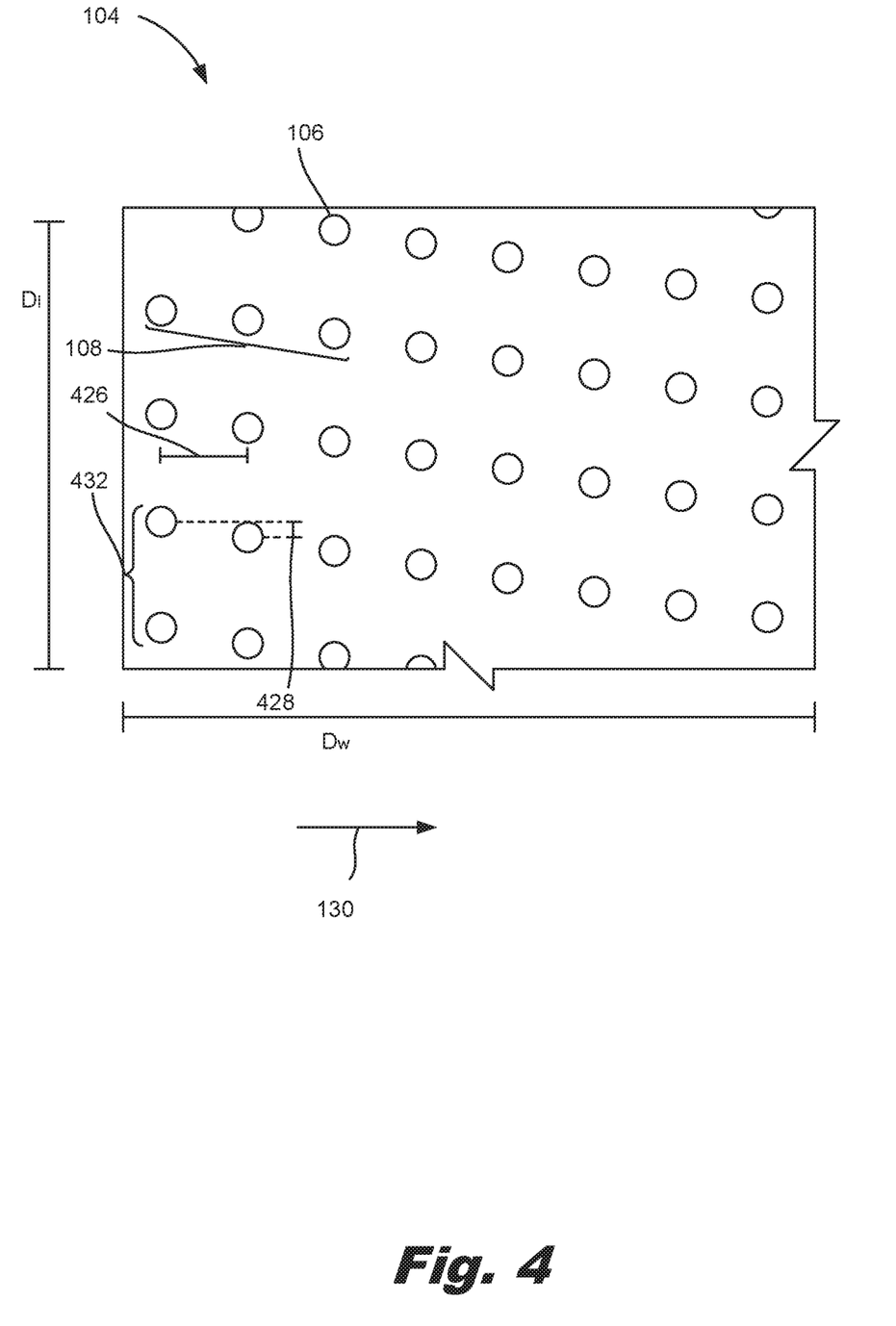
FIG. 4 is a bottom view of a fluidic ejection die of an additive manufacturing module with nozzles at different die widths, according to an example of the principles described herein.

FIG. 4 is a bottom view of a fluidic ejection die (104) of an additive manufacturing module (FIG. 1, 100) with nozzles (106) at different die widths, according to an example of the principles described herein. Specifically, FIG. 4 is a bottom view of a portion of the fluidic ejection die (104). As described above, the fluidic ejection die (104) has a die width, Dw, and a die length, Dl. In the example depicted in FIG. 4, the substrate on which the fabrication agent is deposited may move relative to the die width as indicated by the arrow (130) or the fluidic ejection die (104) may move in the direction of the arrow (130) over a substrate such as a powder build material in a bed (FIG. 3, 320). Note that in some examples, the collection of fluidic ejection die (FIG. 1, 104) may match the width of the substrate, i.e., the build area (FIG. 3, 320). As depicted in FIG. 4, in some examples, each set (108) of neighboring nozzles (106) may be non-orthogonal to the die width. Note that while FIG. 4 depicts three nozzles (106) in the set (108), any number of nozzle (106) may form part of the set (108).

In such a configuration, adjacent nozzles (106) within a set (108) have a first offset (428) along a die length, and a second offset (426) along a die width. In some examples, this offset may be described as a difference in die position. For example, the first offset (428) may be described as a difference in die length position of nozzles (106) within the set (108) and the second offset (426) may be described as a difference in die width position of nozzles (106) within the set (108). As depicted in FIG. 4, in some examples the first offset (428) may be different than the second offset (426). In this example, at least one of the first offset (428) and the second offset (426) may be between 84 and 350 micrometers. In another example, at least one of the first offset (428) and the second offset (426) may be $\frac{1}{1200}$ of an inch. Specifically, the first offset (428), or the difference in length position may be $\frac{1}{1200}$ which is less than the diameter of the nozzle (106) such that all portions of the substrate along the die length can receive fluid from the nozzles (106). In other examples, adjacent nozzles (106) within the set (108) of neighboring nozzles (106) may have an offset along the die length, i.e., the first offset (428) that matches an offset along a die width, i.e., the second offset (426).

In addition to a spacing between nozzles (106) in a set (108), each set (108) may be spaced from adjacent sets (108). For example, each set (108) may have a set offset (432) of $\frac{8}{1200}$ of an inch from each other.

Figure 5:
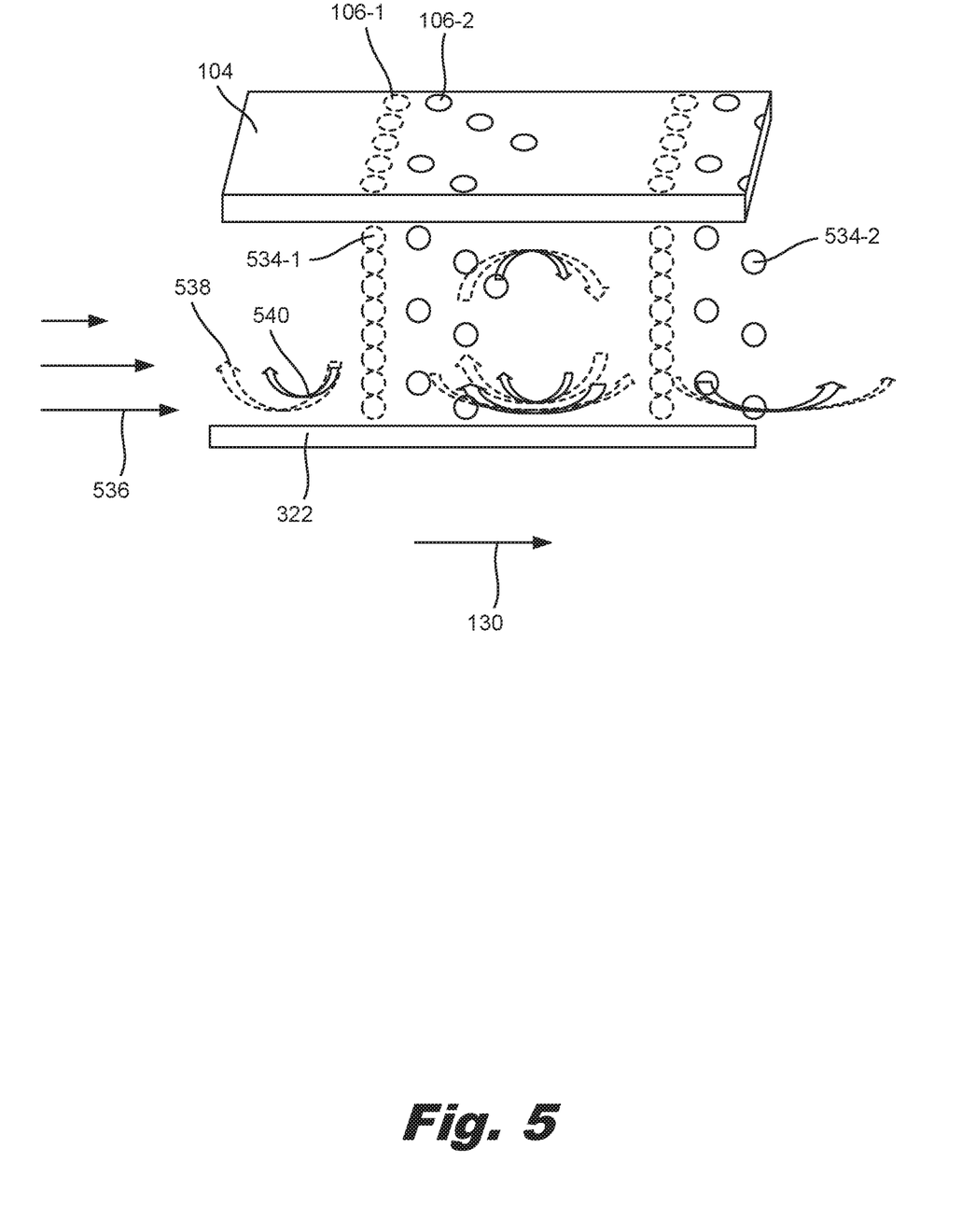
FIG. 5 is an isometric view of a fluidic ejection die of an additive manufacturing module with nozzles at different die widths, according to an example of the principles described herein.

FIG. 5 is an isometric view of a fluidic ejection die (104) of an additive manufacturing module (FIG. 1, 100) with nozzles (106) at different die widths, according to an example of the principles described herein. In the example depicted in FIG. 5, the substrate moves in the direction indicated by the arrow (130) or the fluidic ejection die (104) moves in the direction indicated by the arrow (130). As described above, nozzles (106-1) previously have been aligned orthogonal to both the die width and the die length. In FIG. 5 such orthogonally-aligned nozzles (106-1) are depicted in ghost. In this situation, the airstreams created as each nozzle (106-1) ejects fluid (534-1) interact with one another. That is, as fluid drops travel through the air, they lose velocity due to wind resistance/drag. That lost energy is transferred to the air, creating an airstream/wind current that interacts with other airstreams, drops of fluid, and/or powder. This interaction creates strong airstreams (538) parallel to, and in the same or opposite direction, as the slipstreams (536) formed from the movement of the bed (322)/movement of the fluidic ejection die (104). The airstreams (538) formed by orthogonal nozzles are also depicted in ghost. The interaction of this air, in particular the airstreams (538) that are in an opposite direction of the slipstream (536) generate strong vortices that can disrupt the flow of fluid (534) towards the bed (322), and cause deposited fluid (534) and particulate build material to enter upwards into the nozzles (106) leading to potential clogs and drops in performance.

However, when the nozzles (106-2) are offset as depicted in FIG. 5 as solid lines, the interaction of airstreams (540) from individual nozzles (106-2) is reduced. The reduced interaction reduces the strength of the airstreams (540) that are parallel as more of the airstreams flow in a direction perpendicular to the slipstream (536). That is, the increased spacing of nozzles (106) in the non-orthogonal array evens out the flow of the combined airstreams (540) perpendicular to, and parallel to, the slipstream (536) above the bed (322). The reduced-strength airstreams (540) are indicated in a solid line. The reduced strength of the parallel airstreams (540) reduces the vortices between the fluidic ejection die (104) and the bed (322) thus reducing the likelihood of particulate matter and/or fluid (534-2) being drawn up onto the fluidic ejection die (104) where it could, either directly or indirectly, interfere with nozzle (106) operation. The reduced strength vortices also reduce the likelihood that fluid (534-2) being ejected will be altered along its drop flight path.

Figure 6:
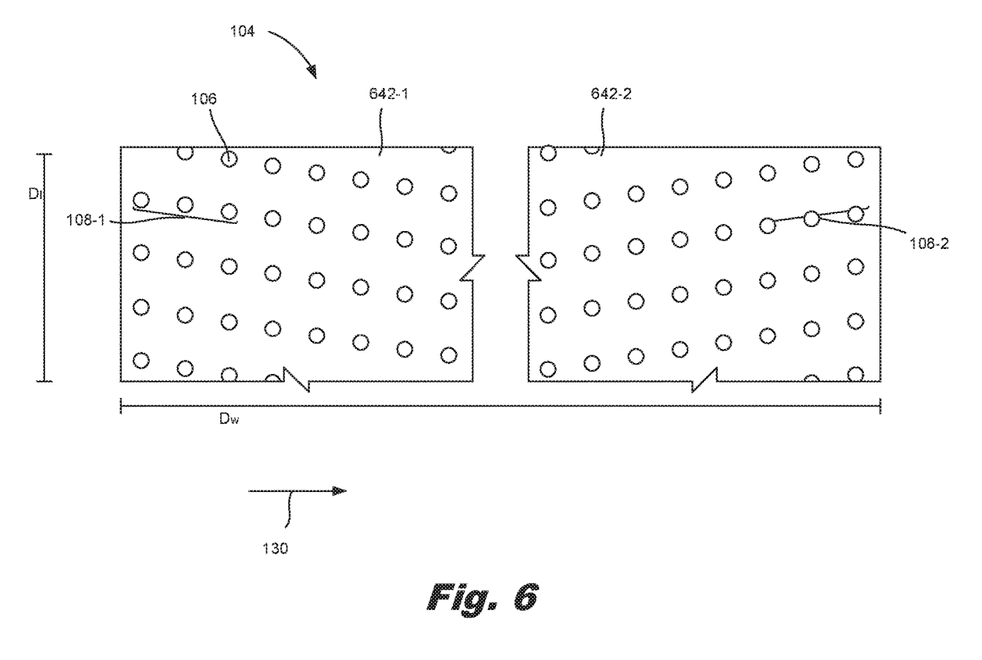
FIG. 6 is a bottom view of a fluidic ejection die of an additive manufacturing module with nozzles at different die widths, according to an example of the principles described herein.

FIG. 6 is a bottom view of a fluidic ejection die (104) with nozzles (106) at different die widths, according to an example of the principles described herein. In some examples, the plurality of nozzles (106) may be divided into multiple arrays (642-1, 642-2) with each having sets (108-1, 108-2) of neighboring nozzles (106) with different die width positions relative to one another. For example, in a first set (108-1) of neighboring nozzles (106), an adjacent nozzle that is lower along the die length may have a die width position that is greater than the immediately upstream nozzle. In a second set (108-2) on a second array (642-2), an adjacent nozzle that is lower along the die length may have a die width position that is less, measuring from the left for example, than the immediately upstream nozzle. In one example, the different arrays (642) may be shifted mirrors of one another along a length of the fluidic ejection die (104).

In summary, using such an additive manufacturing module 1) spreads air flow resulting from fluid dejection and/or drops in flight more evenly in multiple directions; 2) reduces the shear force in the vicinity of the build area; 3) prevents particle entry into the fluidic ejection nozzles; 4) improves ejection accuracy, and 5) improves additive manufacturing device life.

What is claimed is:

1. An additive manufacturing nodule comprising:
    an agent distributor to selectively distribute a fabrication agent onto layers of build material, wherein the agent distributor comprises:
    at least one rectangular fluidic ejection die comprising:
        a plurality of nozzles arranged into sets of nozzles on the at least one rectangular fluidic die ejection, wherein:
            the nozzles in a set are arranged into angled columns along a die length and a die width,
            the angled columns are arranged such that, for each set of neighboring nozzles, a respective subset of each set of neighboring nozzles are positioned at different die width positions,
            each angled column is non-orthogonal to the die width and the die length,
            the die width and the die length are orthogonal to one another, and
            the nozzles in different sets are shifted mirrors of one another about an axis of symmetry along the die length:
        for each respective nozzle of the plurality of nozzles, a respective ejection chamber fluidically coupled to a respective nozzle; and
    for each respective ejection chamber, at least one respective fluid feed hole fluidically coupled to a respective ejection chamber;
    wherein adjacent nozzles within an angled column have a pitch such that a resulting output of the adjacent nozzles overlap.

2. The additive manufacturing module of claim 1, wherein each set of neighboring nozzles are non-orthogonal respective to the die width.

3. The additive manufacturing module of claim 1 wherein the adjacent nozzles within a set of neighboring nozzles:
    have a. first offset along the die length; and
    have a second offset along the die width; and
    the second offset is different than the first offset.

4. The additive manufacturing module of claim 3, wherein at least one of the first offset and the second offset are between 84 and 350 micrometers.

5. The additive manufacturing module of claim 3, wherein at least one of the first offset and the second offset is 1/1200 of an inch.

6. The additive manufacturing module of claim 1, wherein adjacent nozzles within a set of neighboring nozzles have an offset along the die length that matches an offset along a die width.

7. The additive manufacturing module of claim 1, wherein adjacent sets of neighboring nozzles have a pitch spacing of 8/1200 of an inch.

8. The additive manufacturing module of claim 1, wherein each set of neighboring nozzles includes at least three respective nozzles, and the respective subset of each set of neighboring nozzles comprises one nozzle.

9. An additive manufacturing device comprising:
a build material distributor to successively deposit layers of build material into a build area; and
an agent distributor to selectively distribute a fabrication agent onto the layers of build material, the agent distributor comprising:
at least one rectangular fluidic ejection die comprising:
a plurality of nozzles arranged into sets of nozzles on the at least one rectangular fluidic die, wherein:
the nozzles in a set are arranged into angled columns along a die length,
the angled columns are distributed across a die width,
the angled columns are arranged such that each angled column is non-orthogonal to the die width and the die length,
the die width and the die length are orthogonal to one another, and
the nozzles in different sets are shifted mirrors of one another about an axis of symmetry along the die length;
for each respective nozzle of the plurality of nozzles, a respective ejection chamber fluidically coupled to a respective nozzle; and
for each respective ejection chamber, at least one respective fluid feed hole fluidically coupled to a respective ejection chamber;
wherein adjacent nozzles within an angled column have a pitch such that a resulting output of the adjacent nozzles overlap.

10. An additive manufacturing system comprising:
a bed to contain a volume of build material;
a build material distributor to successively deposit layers of the build material into a build area; and
an agent distributor to selectively distribute a fabrication agent onto the layers of build material, the agent distributor comprising:
at least one rectangular fluidic ejection die which is to reduce vortices between the at least one rectangular fluidic ejection die and the bed, the at least one fluidic ejection die comprising:
a plurality of nozzles arranged into sets of nozzles on the at least one rectangular fluidic die, wherein:
the nozzles in a set are arranged into angled columns along a die length,
the angled columns are distributed across a die width,
the angled columns are arranged such that, each angled column is non-orthogonal to the die width and the die length, ∝ the die width and the die length are orthogonal to one another, and
the nozzles in different sets are shifted mirrors of one another about an axis of symmetry along the die length;
for each respective nozzle of the plurality of nozzles, a respective ejection chamber fluidically coupled to a respective nozzle; and
for each respective ejection chamber, at least one respective fluid feed hole fluidically coupled to a respective ejection chamber;
wherein adjacent nozzles within an angled column have a pitch such that a resulting output of the adjacent nozzles overlap.

11. The additive manufacturing system of claim 10, wherein the bed moves in a vertical direction as successive layers of build material are deposited into the build area.

12. The additive manufacturing system of claim 10, wherein the agent distributor translates in a horizontal direction to allow placement of the fabrication agent in a predetermined pattern.

13. The additive manufacturing device of claim 9, wherein a difference in length position between the plurality of nozzles arranged into an angled column is less than a diameter of the nozzles.

14. The additive manufacturing system of claim 10, wherein the angled columns are non-orthogonal to a direction of fluidic ejection die movement across the bed.

15. The additive manufacturing system of claim 10, wherein:
in a first set of neighboring nozzles in a first array, an adjacent nozzle that is lower along the die length has a die width position that is greater than an immediately upstream nozzle; and
in a second set of neighboring nozzles in a second array, an adjacent nozzle that is lower along the die length has a die width position that is less than an immediately upstream nozzle.

16. The additive manufacturing device of claim 9, wherein a first offset between the nozzles in a first direction is less than a diameter of a nozzle while a second offset between the nozzles in a second direction is greater than the diameter of the nozzle.

17. The additive manufacturing device of claim 13, wherein a first direction is the die width and a second direction is the die length.

* * * * *